(12) United States Patent
Chen et al.

(10) Patent No.: US 11,252,121 B2
(45) Date of Patent: Feb. 15, 2022

(54) MESSAGE SENDING METHOD AND TERMINAL DEVICE

(71) Applicant: ALIBABA GROUP HOLDING LIMITED, Grand Cayman (KY)

(72) Inventors: Jianfeng Chen, Hangzhou (CN); Pan Zeng, Hangzhou (CN); Hui Chen, Hangzhou (CN); Zhoufeng Chen, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 87 days.

(21) Appl. No.: 16/138,894

(22) Filed: Sep. 21, 2018

(65) Prior Publication Data
US 2019/0028420 A1 Jan. 24, 2019

Related U.S. Application Data

(63) Continuation of application No. PCT/CN2017/076238, filed on Mar. 10, 2017.

(30) Foreign Application Priority Data

Mar. 23, 2016 (CN) .......................... 201610170132.8

(51) Int. Cl.
*H04L 12/58* (2006.01)

(52) U.S. Cl.
CPC .............. *H04L 51/22* (2013.01); *H04L 51/16* (2013.01)

(58) Field of Classification Search
CPC ......... H04L 51/22; H04L 51/16; H04L 51/24; H04L 51/34; H04L 49/90; H04L 51/26;
(Continued)

(56) References Cited

U.S. PATENT DOCUMENTS 5,961,659 A * 10/1999 Benner ................. H04L 1/1887
710/52
6,529,932 B1 * 3/2003 Dadiomov .............. G06F 9/466
709/201
(Continued)

FOREIGN PATENT DOCUMENTS

CN 101739301 A 6/2010
CN 101977358 A 2/2011
(Continued)

OTHER PUBLICATIONS

PCT International Search Report issued in International Application No. PCT/CN2017/076238, dated May 31, 2017 (4 pages).
(Continued)

*Primary Examiner* — Caroline H Jahnige
(74) *Attorney, Agent, or Firm* — Finnegan, Henderson, Farabow, Garrett & Dunner, LLP

(57) ABSTRACT

Embodiments of the disclosure provide methods and devices for sending messages. The method can include: storing identifiers corresponding to one or more messages that are to be sent in a first message identifier queue; storing identifiers corresponding to one or more messages that are being sent in a second message identifier queue; acquiring an identifier corresponding to a message in the first message identifier queue; moving the identifier to the second message identifier queue; and sending the message according to a sending order associated with the identifier in the second message identifier queue.

12 Claims, 7 Drawing Sheets

(58) Field of Classification Search
CPC ....... H04L 47/50; H04L 47/34; H04L 47/622; H04L 1/1835; H04L 5/0055; H04L 2012/5681; H04L 47/10; H04L 67/2842; H04L 51/04; H04L 67/1097; H04L 51/14; H04L 67/26; H04L 69/40; H04L 1/1887; H04L 45/28; H04L 47/522; H04L 47/6295; H04L 49/3027; G06F 9/546; G06F 2209/548; G06F 9/466; G06F 9/542; G06F 9/544; G06F 11/1471; G06F 2209/547; G06F 13/1689; G06F 9/4881; G06F 11/2064; G06F 3/067; H04W 28/02
See application file for complete search history.

(56) References Cited

U.S. PATENT DOCUMENTS

| | | | |
|---|---|---|---|
| 8,261,286 B1* | 9/2012 | Fateev | G06F 9/546 709/203 |
| 2008/0196039 A1* | 8/2008 | Garrard | H04L 47/2458 719/314 |
| 2010/0070588 A1* | 3/2010 | Sinn | H04L 51/04 709/206 |
| 2017/0214762 A1* | 7/2017 | Swain | H04L 51/26 |

FOREIGN PATENT DOCUMENTS

| | | |
|---|---|---|
| CN | 102970371 A | 3/2013 |
| CN | 103199968 A | 7/2013 |
| CN | 103220206 A | 7/2013 |
| CN | 104731722 A | 6/2015 |
| CN | 104954446 A | 9/2015 |
| CN | 105357305 A | 2/2016 |
| EP | 1463249 A2 | 9/2004 |
| WO | WO 2017/162045 A1 | 9/2017 |

OTHER PUBLICATIONS

First Chinese Search Report issued in corresponding Chinese Application No. 201610170132.8 dated Oct. 22, 2019 (2 pages).

* cited by examiner

First message identifier queue

First message identifier queue

MESSAGE SENDING METHOD AND TERMINAL DEVICE

CROSS REFERENCE TO RELATED APPLICATION

The disclosure claims the benefits of priority to International application number PCT/CN2017/076238, filed Mar. 10, 2017, and Chinese application number 201610170132.8, filed Mar. 23, 2016, both of which are incorporated herein by reference in their entireties.

BACKGROUND

Conventionally, to ensure that a message is used at least once to achieve the reliability during use of the message, there are two solutions as below:
 1) a server management solution of managing read states of messages by a message system server; and
 2) a client management solution of managing read states of messages by a consumption system client.

The server management solution can be implemented in two manners. In a first manner, the message system server adds an attribute to metadata information of a message to record whether the message has been successfully used. For example, the usage state of the message is set to "unused" when the message is sent to the message system server. The message system server sets the state of the message to "in use" after a user acquires the message. The message system server actively sets the state of the message to "used" after the user uses the message successfully. If the user fails to use the message successfully within an appointed time, the system can change the state of the message from "in use" to "unused," so that the message can be re-used to ensure that the message is consumed at least once.

In a second manner, the message system server divides a queue into two parts: an "unused message queue" and an "in-use message queue." A message enters the "unused message queue" after being sent to the message system server. A user acquires the message and moves the message from the "unused message queue" to the "in-use message queue." After using the message successfully, the user actively deletes the message from the "in-use message queue." Otherwise, after it exceeds a specified period of time, the message system server will move the message from the "in-use message queue" to the "unused message queue," so that the message can be re-used to ensure that the message is used at least once.

According to the client management solution, a client in a message system manages a message, and when the message is not used successfully, the client restores the message by using a lock service such that the message can be re-used.

But these conventional methods have at least the following problems. First, according to the first manner in the server management solution, the message system server needs to modify an attribute of a message when managing the message, But modifying the attribute of the message will introduce a large number of random disk reads and writes, seriously affecting the performance of the server. Moreover, each time a message is sent to a user, "in use" and "used" messages need to be filtered out, and thus the implementation solution is relatively complex. According to the second manner in the server management solution, if a message fails to be used, the server will add the message to the tail of the "unused message queue." If the message is used according to a usage rule, e.g., a rule of first-in-first-out, the message can be delayed seriously when being re-used, which goes against the rule of first-in first-out. The client management solution also has problems, as it increases the complexity of the client as it is the client that manages the message. Moreover, in order to ensure that the message is used at least once, a lock service needs to be used in the case where the message is not used successfully, which further increases system maintenance costs and the difficulty in using the client.

SUMMARY OF THE DISCLOSURE

Embodiments of the disclosure provide a method for sending messages. The method can include: storing identifiers corresponding to one or more messages that are to be sent in a first message identifier queue; storing identifiers corresponding to one or more messages that are being sent in a second message identifier queue; acquiring an identifier corresponding to a message in the first message identifier queue; moving the identifier to the second message identifier queue; and sending the message according to a sending order associated with the identifier in the second message identifier queue.

Embodiments of the disclosure also provide a terminal device. The terminal device can include: one or more memories storing a set of instructions, wherein the one or more memories further includes a first message identifier queue and a second message identifier queue, the first message identifier queue is configured to store identifiers corresponding to messages that are to be sent, and the second message identifier queue is configured to store identifiers corresponding to messages that are being sent; and a processor configured to execute the set of instructions to cause the terminal device to: acquire an identifier corresponding to a message in the first message identifier queue; move the identifier to the second message identifier queue; and send the message according to a sending order associated with the identifier in the second message identifier queue.

Embodiments of the disclosure further provide a non-transitory computer readable medium that stores a set of instructions that is executable by at least one processor of a terminal device to cause the terminal device to perform a method for sending messages. The method can include: storing identifiers corresponding to one or more messages that are to be sent in a first message identifier queue; storing identifiers corresponding to one or more messages that are being sent in a second message identifier queue; acquiring an identifier corresponding to a message in the first message identifier queue; moving the identifier to the second message identifier queue; and sending the message according to a sending order associated with the identifier in the second message identifier queue.

BRIEF DESCRIPTION OF THE DRAWINGS

In order to illustrate the technical solutions according to the embodiments of the present invention or in the prior art more clearly, the accompanying drawings for describing the embodiments or the prior art are introduced briefly in the following. It is apparent that the accompanying drawings in the following description are only some embodiments of the present invention. Those of ordinary skill in the art can obtain other drawings according to the accompanying drawings without any creative efforts.

DETAILED DESCRIPTION

To make the objectives, technical solutions, and advantages of the embodiments of the present disclosure clearer, the technical solutions in the embodiments of the present disclosure will be clearly and fully described below with reference to the accompanying drawings in the embodiments of the present disclosure. It is apparent that the embodiments to be described are only some of, rather than all, the embodiments of the present disclosure. All other embodiments derived by those of ordinary skill in the art based on the embodiments of the present disclosure without creative efforts fall within the protection scope of the present disclosure.

Figure 1:
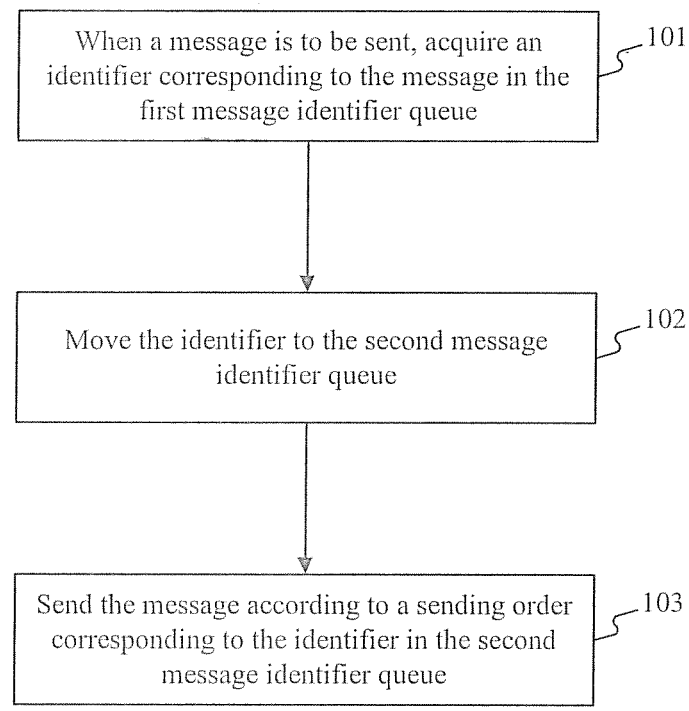
FIG. 1 is a flowchart of an exemplary message sending method, according to embodiments of the present disclosure.

To address the above problems, the present disclosure provides a message sending method. As shown in FIG. 1, in order to use a message at least once, a method can be applied to a terminal device including a first message identifier queue and a second message identifier queue. The first message identifier queue is used for storing identifiers corresponding to messages that wait to be sent, and the second message identifier queue is used for storing identifiers corresponding to messages that are being sent. The identifiers indicate an order of sending the messages. The method can include steps 101-103.

In step 101, when a message is to be sent, the terminal device acquires an identifier corresponding to the message in a first message identifier queue. For example, when a message is to be sent, the message may be sent for a first time or may be re-sent. At this point, an identifier corresponding to the message can be stored in the first message identifier queue, and an order of sending the message can be sent according to an identifier corresponding to the message in the first message identifier queue.

The terminal device can be a terminal device at a server side. The terminal device can send the message according to the order of the identifier corresponding to the message. As the identifier in the first message identifier queue corresponds to the message waiting to be sent, the identifier corresponding to the message can be acquired and then the message may be sent.

The identifier corresponding to the message stored in the first message identifier queue cannot be sent directly. The message in the first message identifier queue may be moved to a second message identifier queue identifier, and then the message can be sent according to an identifier in the second message identifier queue. The identifier corresponding to the message that is being sent and stored in the second message identifier queue can be sent directly. The terminal device can send the corresponding message only according to the identifier stored in the second message identifier queue, and the terminal device may not send the message after filtering the message or the identifier corresponding to the message. At a same time, as the identifier is used for representing an order of sending the corresponding message, the terminal device processes the corresponding message according to the order of the identifier in the first message identifier queue or the second message identifier queue. Thus, it solves the problem that if the message is used according to a usage rule, e.g., a rule of first-in-first-out and a serious delay will be generated when the message is re-used. Moreover, as maintenance is carried out at the server side, maintenance costs and usage difficulty of the client are reduced.

In step 102, the terminal device moves the identifier to the second message identifier queue.

In step 103, the terminal device sends the message according to a sending order corresponding to the identifier in the second message identifier queue. For example, after the terminal device moves the identifier corresponding to the message from the first message identifier queue to the second message identifier queue, the terminal device can determine a sending order of the corresponding message according to identifiers currently existing in the second message identifier queue to ensure that the message can be sent according to the sending order of the corresponding identifier.

The terminal device does not need to make any modifications to the message in the process of sending the message, which reduces operational complexity and occurrence of unnecessary errors. Moreover, while sending the message, the terminal device may not filter the message, which avoids the problem of a complex implementation manner.

The identifier is arranged in the first message identifier queue or the second message identifier queue according to the sending order. The terminal device can process the message according to an arrangement order of the identifier in the first message identifier queue or the second message identifier queue.

When the terminal device acquires the message, the method further includes: determining, by the terminal device, the sending order of the message according to a preset message sending rule; allocating, by the terminal device, the identifier to the message according to the sending order; determining, by the terminal device, the arrangement order of the identifier in the first message identifier queue according to the identifier; and storing, by the terminal device, the identifier in the first message identifier queue according to the arrangement order, so that the terminal device processes the message according to the arrangement order of the identifier in the first message identifier queue.

For example, when the terminal device acquires the message, the terminal device can assign an identifier to the message, so that the terminal device can insert the identifier into the first message identifier queue. As the arrangement order of the identifier in the first message identifier queue is determined according to a sending order of the message, the terminal device can determine the sending order of the message according to a preset message sending rule before assigning an identifier to the message. For example, when the preset message sending rule is first-in-first-out, the terminal device can assign an identifier to the message according to a receiving order of the message, and the identifier assigned to the message can represent a sending order of the message. It is appreciated that the preset message sending rule can also be another rule. For example, the message can be sent according to a degree of importance of the message or the like. After the terminal device has assigned the identifier to the message, the terminal device can determine a position of the identifier in the first message identifier queue according to the identifier and store the identifier. After storing the identifier in the first message identifier queue, the terminal device can perform processing according to an order of the identifier in the first message identifier queue.

Sending the message according to a sending order corresponding to the identifier in the second message identifier queue can further include: arranging, by the terminal device, the identifier in the second message identifier queue according to a sending order of the message corresponding to the identifier. Therefore, the terminal device can send the message corresponding to the identifier according to an arrangement order of the identifier in the second message identifier queue.

For example, after the terminal device moves the identifier corresponding to the message from the first message identifier queue to the second message identifier queue, the terminal device can determine a position of the identifier according to identifiers currently existing in the second message identifier queue to ensure that the message may not be delayed or advanced according to sending of the message.

After the step of sending the message according to a sending order corresponding to the identifier in the second message identifier queue, the method further includes: determining whether a feedback message of the message is received in a preset time; deleting the message and the identifier corresponding to the message in the second message identifier queue if the feedback message of the message is received in the preset time; and re-sending the message if no feedback message of the message is received in the preset time.

For example, when the terminal device receives a feedback message of the message within the preset time, it indicates that the message is used successfully. In this case, the message and the identifier corresponding to the message are useless information and thus can be deleted. When the terminal device does not receive a feedback message of the message in the preset time, it indicates that the message is not used successfully. To ensure the reliability of message use, the terminal device can re-send the message such that the message is used successfully.

Re-sending the message can include: moving, by the terminal device, the identifier corresponding to the message from the second message identifier queue to the first message identifier queue; determining, by the terminal device, an arrangement order of the identifier in the first message identifier queue according to a sending order of the message corresponding to the identifier; storing, by the terminal device, the identifier in the first message identifier queue according to the arrangement order; and moving, by the ten al device, the identifier to the second message identifier queue when the terminal device re-acquires the identifier in the first message identifier queue according to the arrangement order, so that the terminal device re-sends the message corresponding to the identifier.

For example, when the message is not used successfully, the message can be re-sent such that the message can be used successfully. The terminal device can move the identifier corresponding to the message to the first message identifier queue, compare the identifier with identifiers existing in the first message identifier queue, determine a position of the identifier in the first message identifier queue, and insert the identifier. In this case, the position of the identifier in the first message identifier queue corresponds to a sending order of the message in all the current messages. Therefore, the sending order of the message may not be delayed or advanced to be inconsistent with the preset message sending rule. After the message is arranged in the first message identifier queue and after acquisition of the identifier according to an arrangement order in the first message identifier queue, the terminal device moves the identifier to the second message identifier queue such that the message corresponding to the identifier is re-sent. The terminal device determines a position of the identifier in the second message identifier queue according to the identifier and inserts the identifier.

When the terminal device moves multiple identifiers in the first message identifier queue to the second message identifier queue at a time according to a sending order of messages corresponding to the identifiers, the method further includes: determining an arrangement order of the multiple identifiers in the second message identifier queue according to the sending order of the messages corresponding to the multiple identifiers; segmenting the multiple identifiers in the second message identifier queue into multiple intervals according to the arrangement order based on a preset sending scheme; and determining a sending order of the multiple intervals according to the sending order of the messages corresponding to the multiple identifiers. Therefore, the terminal device can send the messages corresponding to the identifiers in the multiple intervals according to the determined sending order of the multiple intervals.

For example, to send messages rapidly, the terminal device can also segment identifiers, which are acquired at a time, in the second message identifier queue according to the arrangement order based on a preset sending scheme. After the segmentation, each interval can include at least one identifier, and the terminal can send messages corresponding to all the identifiers included in an interval and can send the intervals according to a sending order of the messages corresponding to the identifiers.

The first message identifier queue and the second message identifier queue can be implemented by using a key value system. Further, identifiers in the first message identifier queue and the second message identifier queue can be stored after key values have been assigned to the messages. The key value system can be a distributed key value system.

In the present disclosure, when a message is to be sent, an identifier corresponding to the message in the first message identifier queue can be acquired. The identifier can be moved to the second message identifier queue, and then the terminal device can send the message according to a sending order corresponding to the identifier in the second message identifier queue. While it is ensured that the message can be used at least once, an attribute of the message may not be modified as identifiers corresponding to messages to be sent and identifiers corresponding to messages that are being sent can be stored in the first message identifier queue and the second message identifier queue, respectively. Moreover, the identifier stored in the queue may not be distinguished when the message is sent, reducing the complexity of solution implementation. Meanwhile, the identifier can be used for representing a sending order of the message corresponding to the identifier, the identifier can be arranged in the first message identifier queue or the second message identifier queue according to the sending order, and the terminal device processes the message according to the arrangement order of the identifier in the first message identifier queue or the second message identifier queue. Thus, the problem of generating a serious delay when the message is re-used according to a usage rule (e.g., a rule of first-in-first-out) can be solved. Furthermore, the message is not managed at a user side, which reduces the complexity of the user side.

In some embodiments, the message can be sent according to a rule of first-in-first-out, and the terminal device can assign an identifier to the message according to a receiving order of the message. For example, if the message is the fifth one received by the terminal device, an identifier corresponding to the message can be five. The identifier can be obtained after a key value is assigned to the message by using the key value system.

Figure 2:
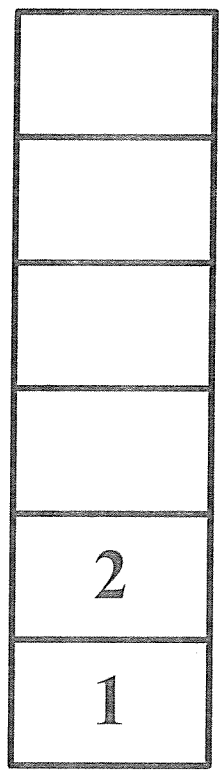
FIG. 2 is a schematic diagram of an exemplary identifier arrangement existing in a first message identifier queue when a terminal device receives messages, according to embodiments of the present disclosure.
Figure 3:
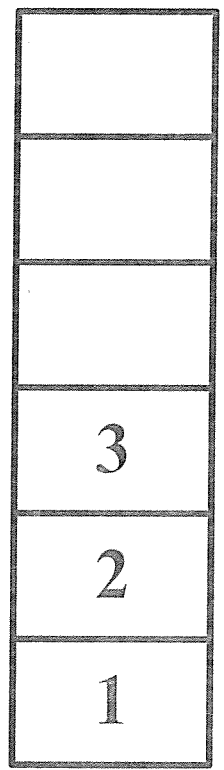
FIG. 3 is a schematic diagram of an exemplary arrangement of an identifier corresponding to a received message in a first message identifier queue, according to embodiments of the present disclosure.

As shown in FIG. 2, when the terminal device receives a message, the terminal device can assign an identifier to the message. As the message is received as, for example, the third one, the identifier can be three and put in a first message identifier queue. Identifiers in the first message identifier queue can be arranged according to values of the identifiers. After the identifiers have been arranged in the first message identifier queue, the first message identifier queue can be shown as in FIG. 3.

Figure 4:
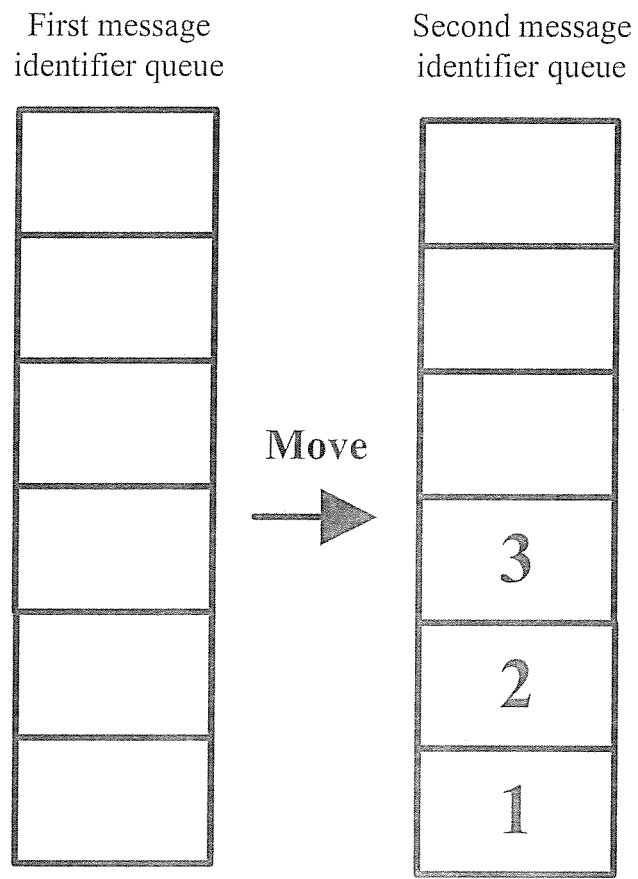
FIG. 4 is a schematic diagram of an exemplary movement of an identifier from the first message identifier queue to a second message identifier queue, according to embodiments of the present disclosure.

When the terminal device sends messages corresponding to identifiers one, two, and three, the terminal device can move the identifiers one, two, and three to the second message identifier queue. For example, as shown in FIG. 4, the identifiers one, two, and three are also arranged in the second message identifier queue according to values corresponding to the identifiers. Thus, the terminal device can send the messages corresponding to the identifiers according to the arrangement order of the identifiers.

Figure 5:
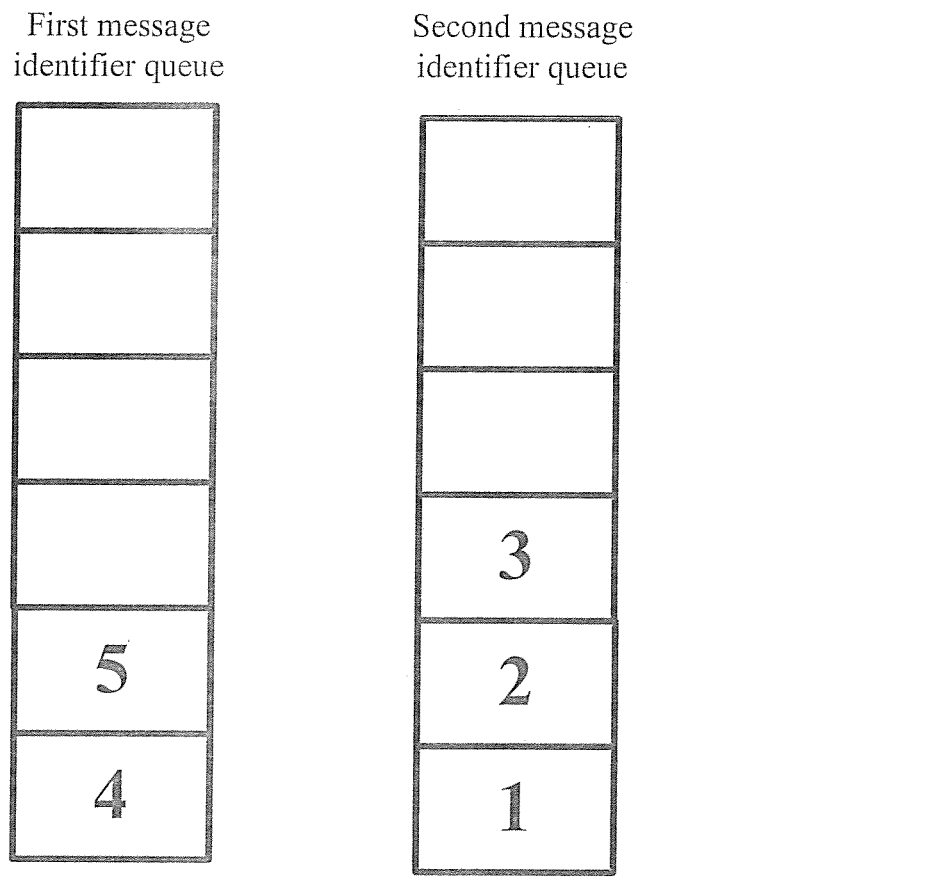
FIG. 5 is a schematic diagram of an exemplary storing of new identifiers in a first message identifier queue when messages are not used successfully, according to embodiments of the present disclosure.
Figure 6:
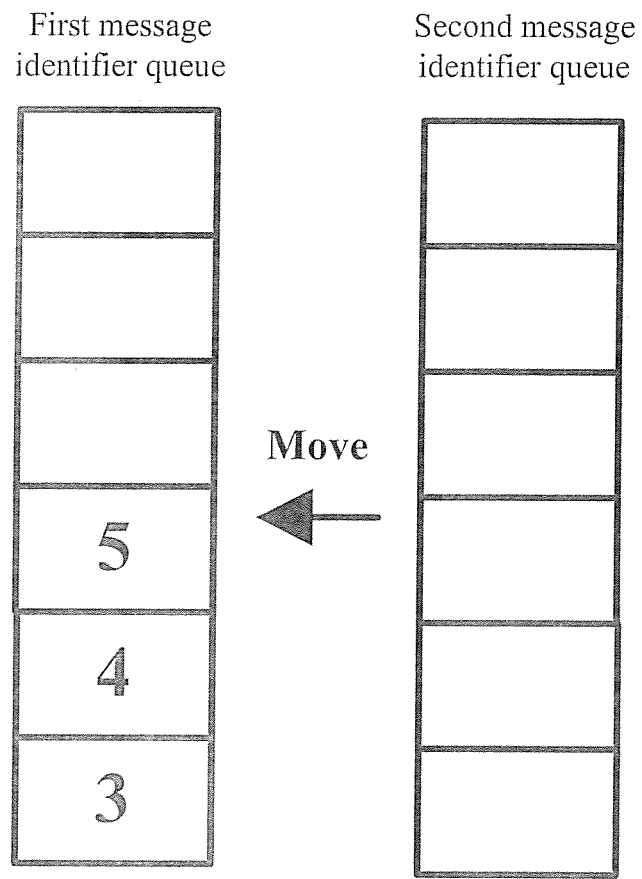
FIG. 6 is a schematic diagram of exemplary movement of identifiers corresponding to messages that are not successfully used from a second message identifier queue to a first message identifier queue, according to embodiments of the present disclosure.

In some embodiments, the messages corresponding to the identifiers one and two are used successfully, but the message corresponding to the identifier three is used unsuccessfully. The terminal device can delete the identifiers one and two in the second message identifier queue and the messages corresponding to the identifiers one and two, and move the identifier three to the first message identifier queue. Thus, if a new identifier is to be stored in the first message identifier queue, as shown in FIG. 5, the terminal device can compare a value corresponding to the identifier in the first message identifier queue with the value corresponding to the identifier three, and sort and store the identifiers in the first message identifier queue. The first message identifier queue after storage is as shown in FIG. 6. The terminal device can send the message according to an arrangement order of the identifier in the first message identifier queue.

When the message corresponding to the identifier three is re-used again, the terminal device can move the identifier three to the second message identifier queue and sort identifiers in the second message identifier queue according to values corresponding to the identifiers, so that the terminal device can send the message according to the sorting.

When the terminal device moves six identifiers from the first message identifier queue to the second message identifier queue at a time and the sending scheme is sending the identifiers by taking 2 identifiers as a group, the terminal device can classify the six identifiers in the second message identifier queue into three groups. The identifiers in the first group are one and two, the identifiers in the second group are three and four, and the identifiers in the third group are five and six. The terminal device can send the three groups of identifiers according to values of the identifiers. In other words, the terminal device can send the three groups of identifiers according to an order from the first group to the third group.

Figure 7:
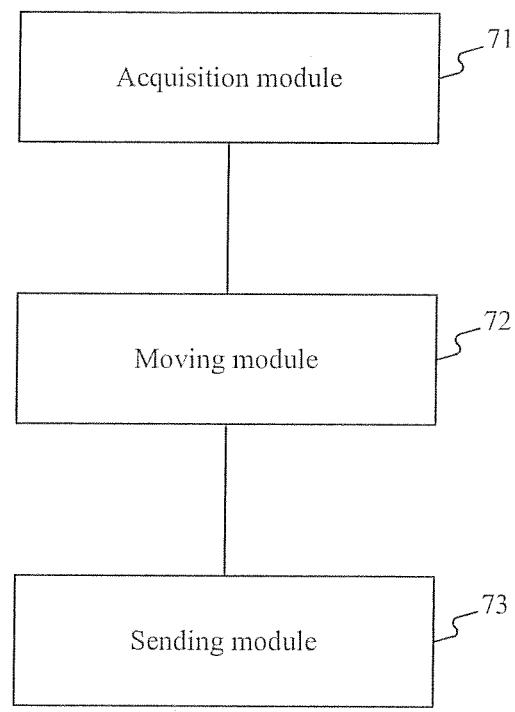
FIG. 7 is a schematic structural diagram of an exemplary terminal device, according to embodiments of the present disclosure.

Embodiments of the disclosure further provide a terminal device. The terminal device can include a first message identifier queue and a second message identifier queue. The first message identifier queue can be used for storing identifiers corresponding to messages to be sent, the second message identifier queue can be used for storing identifiers corresponding to messages that are being sent, and the identifiers can be used for representing a sending order of corresponding messages. As shown in FIG. 7, the terminal device can include an acquisition module 71, a moving module 72, and a sending module 73.

Acquisition module 71 can be configured to, when a message is to be sent, acquire an identifier corresponding to the message in a first message identifier queue.

Moving module 72 can be configured to move the identifier to a second message identifier queue.

Sending module 73 can be configured to send the message according to a sending order corresponding to the identifier in the second message identifier queue.

The identifier can be arranged in the first message identifier queue or the second message identifier queue according to the sending order. The terminal device can process the message according to an arrangement order of the identifier in the first message identifier queue or the second message identifier queue.

The terminal device can further include: a first determination module configured to determine the sending order of the message according to a preset message sending rule when the terminal device acquires the message; an allocation module configured to allocate the identifier to the message according to the sending order; a second determination module configured to determine the arrangement order of the identifier in the first message identifier queue according to the identifier; and a storage module configured to store the identifier in the first message identifier queue according to the arrangement order, so that the terminal device sends the message according to the arrangement order of the identifier in the first message identifier queue.

The terminal device can further include: an arrangement module configured to arrange the identifier in the second message identifier queue according to the sending order of the message corresponding to the identifier.

In, some embodiments, the sending module can be configured to: send the message corresponding to the identifier according to an arrangement order of the identifier in the second message identifier queue.

The terminal device can further include: a determination module configured to determine whether a feedback message of the message is received in a preset time after the terminal device sends the message corresponding to the arrangement order according to the identifier in the second message identifier queue; a deletion module configured to delete the message and the identifier corresponding to the message in the second message identifier queue if the feedback message of the message is received in the preset time; and a re-sending module configured to re-send the message if no feedback message of the message is received in the preset time.

The re-sending module can be further configured to: move the identifier corresponding to the message from the second message identifier queue to the first message identifier queue; determine an arrangement order of the identifier in the first message identifier queue according to a sending order of the message corresponding to the identifier; store the identifier in the first message identifier queue according to the arrangement order; and move the identifier to the second message identifier queue when the acquisition module re-acquires the identifier in the first message identifier queue according to the arrangement order, so that the terminal device re-sends the message corresponding to the identifier.

The arrangement module can be further configured to: when the terminal device moves multiple identifiers in the first message identifier queue to the second message identifier queue at a time according to a sending order of messages corresponding to the identifiers, determine an arrangement order of the multiple identifiers in the second message identifier queue according to a sending order of the messages corresponding to the multiple identifiers.

In some embodiments, the terminal device can further include: a segmentation module configured to segment the multiple identifiers in the second message identifier queue into multiple intervals according to the arrangement order based on a preset sending scheme; and a third determination module configured to determine a sending order of the multiple intervals according to the sending order of the messages corresponding to the multiple identifiers. Thus, the terminal device can send the messages corresponding to the identifiers in the multiple intervals according to the determined sending order of the multiple intervals.

In the present disclosure, when a message is to be sent, an identifier corresponding to the message in the first message identifier queue can be acquired, the identifier can be moved to the second message identifier queue. And then the message can be sent according to a sending order corresponding to the identifier in the second message identifier queue. When it is ensured that the message is used at least once, an attribute of the message may not be modified as identifiers corresponding to messages that wait to be sent and identifiers corresponding to messages that are being sent are stored in the first message identifier queue and the second message identifier queue, respectively. Moreover, the identifier stored in the queue does not need to be distinguished when the message is sent, reducing the complexity of solution implementation. At the same time, the identifier is used for representing a sending order of the corresponding message, the identifier is arranged in the first message identifier queue or the second message identifier queue according to the sending order, and the terminal device processes the corresponding message according to the arrangement order of the identifier in the first message identifier queue or the second message identifier queue, thus solving the problem that if the message is used according to a usage rule, e.g., a rule of first-in first-out, a serious delay will be generated when the message is re-used. Furthermore, the message is not managed at a user side, which reduces the complexity of the user side.

It is appreciated that all or a part of the steps in the method embodiments of the present disclosure can be implemented by a program instructing relevant hardware. The program may be stored in a computer readable storage medium. When the program is executed, the steps in the foregoing method embodiments are performed. The storage medium may be any medium capable of storing program codes, such as a ROM, a RAM, a magnetic disk, or an optical disk.

The foregoing apparatus embodiments are merely exemplary. Units described as separate components may or may not be physically separated. Components shown as units may or may not be physical units, that is, may be located at one place or distributed onto at least two network units. Some or all of the modules may be selected according to actual requirements to achieve the objective of the solution of the embodiment. Those of ordinary skill in the art can understand and implement the present disclosure without creative efforts.

Finally, it is appreciated that the foregoing embodiments are merely provided for describing the technical solutions of the present disclosure, and not intended to limit the present disclosure. Although the present disclosure has been described in detail with reference to the foregoing embodiments, modifications still can be made to the technical solutions described in the foregoing embodiments, or equivalent replacements can be made to some or all of the technical features in the technical solutions, as long as such modifications or replacements do not cause the essence of the corresponding technical solutions to depart from the scope of the technical solutions in the embodiments of present disclosure.

What is claimed is:

1. A method for sending messages, comprising:
    storing one or more identifiers corresponding to one or more messages that wait to be sent in a first message identifier queue;
    storing one or more identifiers corresponding to one or more messages that are to be sent directly in a second message identifier queue;
    acquiring an identifier corresponding to a message in the first message identifier queue, comprising:
        determining a sending order of the message according to a message sending rule;
        assigning the identifier to the message according to the sending order;
        determining the arrangement of the identifier in the first message identifier queue; and
        processing the message according to the arrangement of the identifier in the first message identifier queue;
    moving the identifier to the second message identifier queue;
    arranging the identifier in the second message identifier queue according to the sending order of the message, comprising determining a position of the identifier according to identifiers currently existing in the second message identifier queue; and
    sending the message according to the position of the identifier in the sending order in the second message identifier queue.

2. The method according to claim 1, wherein after sending the message according to the sending order associated with the identifier in the second message identifier queue, the method further comprises:
    determining whether a feedback message of sending the message is received in a preset time period; and
    deleting the identifier corresponding to the message in the second message identifier queue, in response to the feedback message being received in the preset time period; or
    re-sending the message, in response to the feedback message not being received in the preset time period.

3. The method according to claim 2, wherein re-sending the message further comprises:
    moving the identifier corresponding to the message from the second message identifier queue to the first message identifier queue;
    arranging the identifier in the first message identifier queue according to the sending order of the message;

moving the identifier to the second message identifier queue; and re-sending the message.

4. The method according to claim 1, further comprising:

moving multiple identifiers in the first message identifier queue to the second message identifier queue at a time according to the sending order;

determining an arrangement order of the multiple identifiers in the second message identifier queue according to the sending order of the messages corresponding to the multiple identifiers;

segmenting the multiple identifiers in the second message identifier queue into multiple intervals according to the arrangement order based on a sending scheme; and determining an interval sending order of the multiple intervals according to the sending order of the messages corresponding to the multiple identifiers;

sending the messages in the multiple intervals according to the determined interval sending order.

5. A terminal device, comprising:

one or more memories storing a set of instructions, wherein the one or more memories further includes a first message identifier queue and a second message identifier queue, the first message identifier queue is configured to store one or more identifiers corresponding to messages that wait to be sent, and the second message identifier queue is configured to store one or more identifiers corresponding to messages that are to be sent directly; and a processor configured to execute the set of instructions to cause the terminal device to:

acquire an identifier corresponding to a message in the first message identifier queue, comprising:

determining a sending order of the message according to a message sending rule;

assigning the identifier to the message according to the sending order;

determining the arrangement of the identifier in the first message identifier queue; and processing the message according to the arrangement of the identifier in the first message identifier queue;

move the identifier to the second message identifier queue;

arrange the identifier in the second message identifier queue according to the sending order of the message, comprising determining a position of the identifier according to identifiers currently existing in the second message identifier queue; and send the message according to the position of the identifier in the sending order in the second message identifier queue.

6. The terminal device according to claim 5, wherein the processor is further configured to execute the set of instructions to cause the terminal device to:

determine whether a feedback message of sending the message is received in a preset time period;

delete the identifier corresponding to the message in the second message identifier queue, in response to the feedback message being received in the preset time period; and re-send the message, in response to the feedback message not being received in the preset time period.

7. The terminal device according to claim 6, wherein the processor is further configured to execute the set of instructions to cause the terminal device to re-send the message by:

moving the identifier corresponding to the message from the second message identifier queue to the first message identifier queue;

arranging the identifier in the first message identifier queue according to the sending order of the message;

moving the identifier to the second message identifier queue; and re-sending the message.

8. The terminal device according to claim 5, wherein the processor is further configured to execute the set of instructions to cause the terminal device to:

move multiple identifiers in the first message identifier queue to the second message identifier queue at a time according to the sending order;

determine an arrangement order of the multiple identifiers in the second message identifier queue according to the sending order of the messages corresponding to the multiple identifiers;

segment the multiple identifiers in the second message identifier queue into multiple intervals according to the arrangement order based on a sending scheme; and determine an interval sending order of the multiple intervals according to the sending order of the messages corresponding to the multiple identifiers;

send the messages in the multiple intervals according to the determined interval sending order.

9. A non-transitory computer readable medium that stores a set of instructions that is executable by at least one processor of a terminal device to cause the terminal device to perform a method for sending messages, the method comprising:

storing one or more identifiers corresponding to one or more messages that wait to be sent in a first message identifier queue;

storing one or more identifiers corresponding to one or more messages that are to be sent directly in a second message identifier queue;

acquiring an identifier corresponding to a message in the first message identifier queue, comprising:

determining a sending order of the message according to a message sending rule;

assigning the identifier to the message according to the sending order;

determining the arrangement of the identifier in the first message identifier queue; and processing the message according to the arrangement of the identifier in the first message identifier queue;

moving the identifier to the second message identifier queue;

arranging the identifier in the second message identifier queue according to the sending order of the message, comprising determining a position of the identifier according to identifiers currently existing in the second message identifier queue; and sending the message according to the position of the identifier in the sending order in the second message identifier queue.

10. The non-transitory computer readable medium according to claim 9, wherein after sending the message according to the sending order associated with the identifier in the second message identifier queue, the set of instructions is further executed to cause the terminal device to:

determine whether a feedback message of sending the message is received in a preset time period;

delete the identifier corresponding to the message in the second message identifier queue, in response to the feedback message being received in the preset time period; and re-send the message, in response to the feedback message not being received in the preset time period.

11. The non-transitory computer readable medium according to claim 10, wherein re-sending the message further comprises:

moving the identifier corresponding to the message from the second message identifier queue to the first message identifier queue;

arranging the identifier in the first message identifier queue according to the sending order of the message;

moving the identifier to the second message identifier queue; and re-sending the message.

12. The non-transitory computer readable medium according to claim 9, wherein the set of instructions is further executed to cause the terminal device to:

move multiple identifiers in the first message identifier queue to the second message identifier queue at a time according to the sending order;

determine an arrangement order of the multiple identifiers in the second message identifier queue according to the sending order of the messages corresponding to the multiple identifiers;

segment the multiple identifiers in the second message identifier queue into multiple intervals according to the arrangement order based on a sending scheme; and determine an interval sending order of the multiple intervals according to the sending order of the messages corresponding to the multiple identifiers;

send the messages in the multiple intervals according to the determined interval sending order.

* * * * *